May 12, 1959     J. M. McDONALD ET AL     2,885,931
HUB CAP LOCKING DEVICE

Filed Aug. 11, 1955     2 Sheets-Sheet 1

Julius M. McDonald
Jarrett C. King
Milton D. Holland
INVENTORS.

May 12, 1959
J. M. McDONALD ET AL
2,885,931
HUB CAP LOCKING DEVICE
Filed Aug. 11, 1955
2 Sheets-Sheet 2
Fig. 2
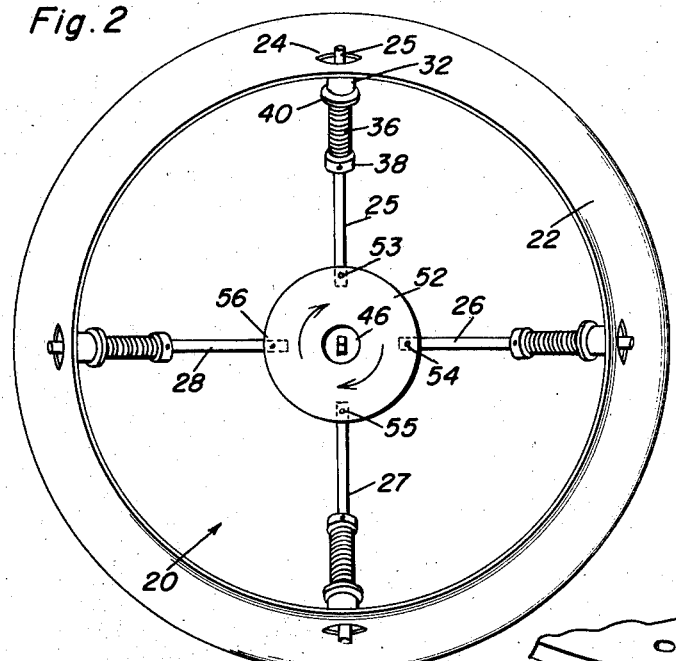
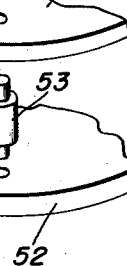
Fig. 5
Fig. 3
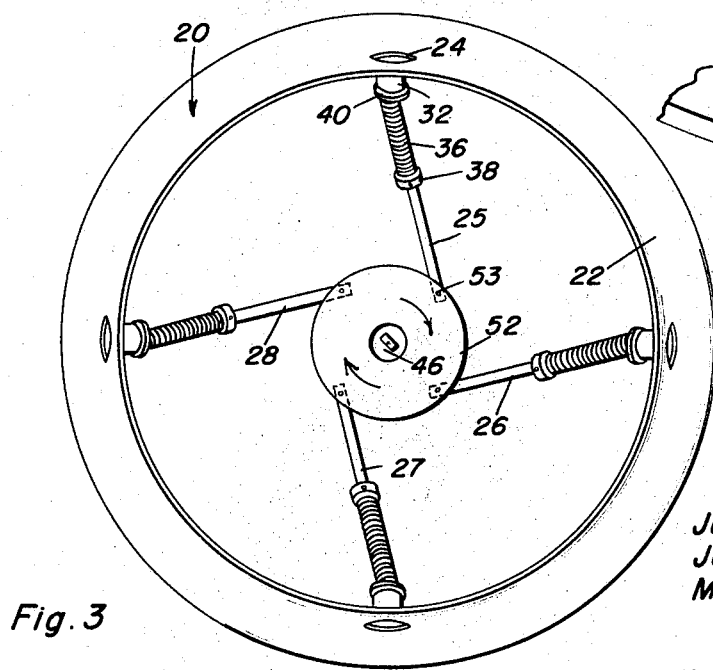
Julius M. McDonald
Jarrett C. King
Milton D. Holland
INVENTORS.
BY
Attorneys

United States Patent Office 2,885,931
Patented May 12, 1959

2,885,931

HUB CAP LOCKING DEVICE

Julius M. McDonald, Columbia, Jarrett C. King, Ridgeway, and Milton D. Holland, Columbia, S.C.

Application August 11, 1955, Serial No. 527,838

2 Claims. (Cl. 70—167)

This invention relates to improvements in hub caps for automotive vehicles, particularly automobiles.

Often, wheel hub caps are lost by either falling from the wheel or by theft. An object of this invention is to provide a locking hub cap which cannot be separated from the vehicle wheel unless a key is used to unlock the same, this key fitting a lock in the center of the hub cap, which prohibits, when in the locked condition, the rotation of a pair of disks between which pivoted rods are supported, the rods being movable through aligned openings in the hub cap flange and wheel of the vehicle.

A further object of this invention is to provide a hub cap with an improved locking structure and assembly which involves a number of rods movable through aligned openings in the hub cap and the wheel, together with springs serving as anti-rattle devices, the springs reacting on a part of the hub cap assembly and the rods thereof.

These, together with other objects and advantages which will become subsequently apparent, reside in the details of construction and operation as more fully hereinafter described and claimed, reference being had to the accompanying drawings forming a part hereof, wherein like numerals refer to like parts throughout; and in which:

Figure 2 is a bottom view of the hub cap showing the locking mechanism in the locked condition;

Figure 3 is a bottom view of the hub cap showing the locking mechanism in the unlocked condition;

Figure 4 is an enlarged sectional view showing one of the rods in the wheel locking position; and Figure 5 is a fragmentary perspective view showing the preferred pivot arrangement for the rods.

Figure 1:
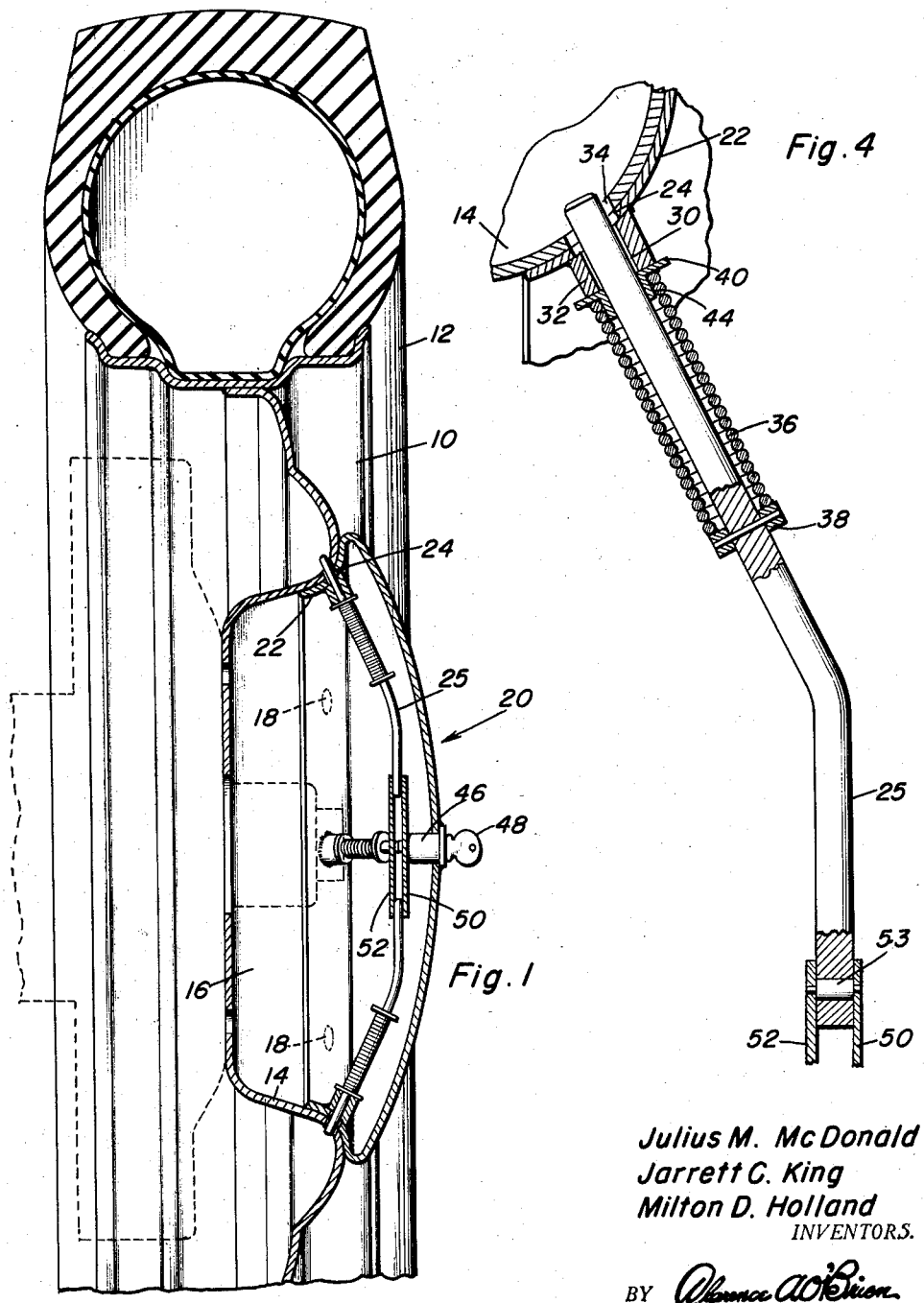
Figure 1 is a fragmentary sectional view of a typical vehicle wheel having the improved hub cap thereon.

In the accompanying drawings, there is a standard vehicle wheel 10 having a tire 12 thereon, this wheel having an annular wall 14 which defines an outwardly opening recess 16 which customarily has the wheel studs, bearing and other conventional vehicle structure therein. Ordinarily, this recess is covered by a hub cap, the hub cap being releasably held in place by one of several different types of friction clamping devices, as small clamps or raised portions such as those at 18 in Figure 1.

The anti-theft hub cap 20 is adapted to take the place of a standard hub cap on the wheel 10. It is of the same general shape of an ordinary hub cap and includes an annular flange 22 which is arranged to be held in recess 16 by frictional contact with wall 14 of the wheel 10. In addition, this annular flange has two or more openings 24 in it to accommodate a rod. Any practical number of rods with their associated structure may be used, depending upon engineering design demands. For the sake of illustration, the hub cap 20 is provided with four rods 25, 26, 27 and 28, each rod being identical in construction. Rod 25 typifies the remainder and as seen in Figure 4 it has a bend of approximately 30° in it between the inner and outer ends. This is to conform to the general shape of the hub cap 20. The outer end of the rod 25 is passed through opening 24 and opening 30 which is formed in the rod guide 32, the latter being welded or otherwise fixed to the inner surface of flange 22 in alignment with opening 24. Wall 14 of wheel 10 has a slot 34 in it to accommodate the outer end of rod 25 and, accordingly, in placing the hub cap 20 on the wheel, the openings 24 and 30 are aligned.

Spring 36 is mounted on the outer end of rod 25 and has one end in abutment with a stop 38 secured to rod 25. The opposite end of the spring 36 bears upon the flange 40 of a collar 44 which is slidable on rod 25. Accordingly, the spring 36 constantly biases the collar against the guide 32 and places rod 25 under a spring load at all times. Therefore, the spring functions as an anti-rattling device and also to unlatch the hub cap or at least facilitate in unlatching it when lock 46 is actuated by its key 48.

Lock 46 is fastened to hub cap 20 in the center thereof and it has a pair of plates 50 and 52 rotatable by and with the barrel of the lock. These plates are spaced from each other and have four pivots 53, 54, 55 and 56 carried thereby, each pivot consisting of a pin having trunnions extending from each end (Figure 4). The inner end of rod 25 has an aperture in it in which the pivot 53 is located and is disposed between the plates 50 and 52. Inasmuch as the trunnions of pivot 53 are disposed in aligned openings in the plates 50 and 52, the rod 25 is mounted for pivotal movement in these plates. The other three rods 26, 27 and 28 are similarly connected to the pair of plates 50 and 52.

In use, hub cap 20 is engaged with the wall 14 of wheel 10 just as an ordinary hub cap is engaged with a wheel. Then key 48 is rotated to actuate the pair of plates 50 and 52 which are secured to the barrel of lock 46 from the position shown in Figure 3 to the position shown in Figure 2. During this actuation of lock 46, the plates 50 and 52, rotating as a unit, move the rods outwardly until they assume a generally radial position (Figure 2), at which time the outer ends of the rods 25 pass through the aligned openings in guide 32, hub cap flange 22, and wheel 10. All of the openings are suitably dimensioned so that there is enough clearance for the rods 25, 26, 27 and 28 to be actuated in this manner. The spring 36 on rod 25 and the other springs on the other rods are compressed a slight amount with their collars bearing against the guides, as guide 32. Upon withdrawal of the key 48 from lock 46, the hub cap 20 is not removable in the absence of destruction thereof.

When removing the hub cap 20, the key 48 is inserted in lock 46 and the barrel of the lock is rotated. This rotation causes a corresponding rotation of plates 52 and 52, whereby all of the rods are retracted sufficiently to separate their outer ends from the openings in the wheel. Aiding in this operation are the springs on the rods.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having described the invention, what is claimed as new is as follows:

1. For use on a motor vehicle wheel that has spaced apertures therein, an attachment consisting of a hub cap covering the front of the wheel only, a lock, a plate operatively connected with said lock for rotation by the latter, a plurality of rods, means pivotally connecting the inner ends of said rods to said plate so that said rods are movable from a radial position with respect to said plate to a generally tangential position with respect thereto whereby the outer ends of said rods are extended and retracted, said hub cap including an inwardly directed flange having openings therein, guides secured to said flange and having openings in alignment with the hub cap flange openings and said wheel apertures and accommodating said rods, said rods being of such length that they are extended and withdrawn into said openings and apertures in response to rotation of said plate, resilient means reacting on each of said rods and said guides for yieldingly holding said rods in said hub cap in order to prevent said rods from rattling, said resilient means comprising for each rod a spring concentrically arranged on its rod, an abutment secured to said rod against which one end of said spring seats, and a sliding collar on said rod and contacting one of said guides, the opposite end of said spring seated on said sliding collar.

2. The attachment of claim 1 wherein there is a second plate movable with the first mentioned plate, and pivot pins connected to said arms and to both of said plates, said pivot pins constituting said means for pivotally connecting the inner ends of said rods to said plate.

References Cited in the file of this patent

UNITED STATES PATENTS

| | | |
|---|---|---|
| 1,889,056 | Blanchard | Nov. 29, 1932 |
| 1,901,613 | Smith | Mar. 14, 1933 |
| 2,118,606 | Jandus | May 24, 1938 |
| 2,154,118 | Ames | Apr. 11, 1939 |
| 2,492,359 | Cossette | Dec. 27, 1949 |
| 2,677,338 | Sassetti | May 4, 1954 |

FOREIGN PATENTS

| | | |
|---|---|---|
| 748,902 | France | Apr. 25, 1933 |